(12) United States Patent
Sulowski

(10) Patent No.: US 9,592,770 B2
(45) Date of Patent: Mar. 14, 2017

(54) LOUDSPEAKER SYSTEM FOR A MOTOR VEHICLE

(71) Applicant: AUDI AG, Ingolstadt (DE)

(72) Inventor: Adam Sulowski, Ingolstadt (DE)

(73) Assignee: AUDI AG, Ingolstadt (DE)

(*) Notice: Subject to any disclaimer, the term of this patent is extended or adjusted under 35 U.S.C. 154(b) by 27 days.

(21) Appl. No.: 14/380,537

(22) PCT Filed: Dec. 19, 2012

(86) PCT No.: PCT/EP2012/005243
§ 371 (c)(1),
(2) Date: Aug. 22, 2014

(87) PCT Pub. No.: WO2013/123955
PCT Pub. Date: Aug. 29, 2013

(65) Prior Publication Data
US 2015/0030178 A1 Jan. 29, 2015

(30) Foreign Application Priority Data
Feb. 24, 2012 (DE) .......... 10 2012 003 772

(51) Int. Cl.
B60R 11/02 (2006.01)
H04R 1/28 (2006.01)
H04R 1/34 (2006.01)
H04R 1/02 (2006.01)

(52) U.S. Cl.
CPC .......... B60R 11/0217 (2013.01); H04R 1/028 (2013.01); H04R 1/288 (2013.01); H04R 1/345 (2013.01); H04R 2499/13 (2013.01)

(58) Field of Classification Search
USPC ................. 381/86, 302, 300, 71.4
See application file for complete search history.

(56) References Cited

U.S. PATENT DOCUMENTS 2,852,997 A * 9/1958 Leslie ............... B60H 1/28
454/147
4,102,359 A * 7/1978 Patel ............... F16L 55/02709
138/40
4,827,890 A * 5/1989 Pociask ............ F02B 29/0475
123/563

(Continued)

FOREIGN PATENT DOCUMENTS

CN 101536538 9/2009
CN 101578201 11/2009

(Continued)

OTHER PUBLICATIONS

Chinese Office Action for related Chinese Patent Application No. 201280061066.0, issued Jul. 22, 2015, 5 pages.

(Continued)

Primary Examiner — Duc Nguyen
Assistant Examiner — Yogeshkumar Patel
(74) Attorney, Agent, or Firm — Staas & Halsey LLP

(57) ABSTRACT

A loudspeaker system for a motor vehicle has a loudspeaker, which is arranged adjacent to at least one wall of the motor vehicle. At least one pipeline originates from the loudspeaker and runs through the wall. A shut-off device for the at least approximately sound-tight closure of the pipeline is arranged in the pipeline.

18 Claims, 2 Drawing Sheets

(56) References Cited

U.S. PATENT DOCUMENTS

| | | | |
|---|---|---|---|
| 5,218,175 A | 6/1993 | Scarlata | |
| 5,409,037 A * | 4/1995 | Wheeler | G01M 3/243 137/487.5 |
| 5,416,844 A * | 5/1995 | Nakaji | G10K 11/1784 381/71.4 |
| 5,568,557 A * | 10/1996 | Ross | G10K 11/1788 381/71.11 |
| 5,651,733 A * | 7/1997 | Schumacher | B64D 11/00 362/471 |
| 5,731,551 A * | 3/1998 | Petrucci | H04R 1/025 181/141 |
| 5,850,458 A * | 12/1998 | Tomisawa | G10K 11/1786 381/71.4 |
| 6,135,604 A * | 10/2000 | Lin | B44F 1/08 119/254 |
| 6,219,871 B1 * | 4/2001 | Frederick | D06F 17/02 68/183 |
| 6,298,943 B1 * | 10/2001 | Yamada | H04R 5/02 181/149 |
| 6,310,958 B1 | 10/2001 | Eisner | |
| 6,536,470 B1 * | 3/2003 | Carn | E03C 1/104 137/505.25 |
| 6,813,777 B1 * | 11/2004 | Weinberger | H04B 7/18508 348/E5.008 |
| 6,871,356 B2 * | 3/2005 | Chang | B60R 11/0235 348/837 |
| 7,684,983 B2 * | 3/2010 | Shikano | G10L 15/20 704/226 |
| 7,937,964 B2 * | 5/2011 | Temple | H04B 1/08 381/300 |
| 7,999,687 B1 * | 8/2011 | Mickelsen | B28C 5/4231 340/540 |
| 8,756,856 B1 * | 6/2014 | Girvin | A01K 97/20 220/560 |
| 2001/0023582 A1 * | 9/2001 | Nagel | F02C 7/045 60/204 |
| 2001/0026623 A1 | 10/2001 | Erwin | |
| 2001/0036281 A1 * | 11/2001 | Astorino | F01N 1/065 381/71.4 |
| 2001/0047903 A1 * | 12/2001 | McWilliam | G10K 11/1788 181/206 |
| 2002/0036078 A1 * | 3/2002 | Janezich | F28F 9/0229 165/164 |
| 2002/0092864 A1 * | 7/2002 | Small | H04R 1/42 222/79 |
| 2003/0069078 A1 * | 4/2003 | Aragona | A63G 3/02 472/117 |
| 2004/0091123 A1 * | 5/2004 | Stark | H04B 1/082 381/86 |
| 2005/0100174 A1 * | 5/2005 | Howard | B60R 11/0217 381/86 |
| 2005/0135642 A1 | 6/2005 | Dry | |
| 2006/0063522 A1 * | 3/2006 | McFarland | H04Q 9/00 455/423 |
| 2006/0063523 A1 * | 3/2006 | McFarland | G08C 17/02 455/423 |
| 2008/0023261 A1 * | 1/2008 | Kaneko | B60J 5/0487 181/204 |
| 2008/0101646 A1 | 5/2008 | Holmi | |
| 2009/0110210 A1 * | 4/2009 | Ludwig | B60R 11/0217 381/86 |
| 2009/0236173 A1 * | 9/2009 | McCain | F01N 1/065 181/206 |
| 2010/0155635 A1 * | 6/2010 | Fima | F16K 37/0075 251/129.01 |
| 2012/0256492 A1 * | 10/2012 | Song | H02J 1/102 307/66 |
| 2013/0188806 A1 * | 7/2013 | Tada | H04R 1/2803 381/86 |
| 2013/0272537 A1 * | 10/2013 | Tada | H04R 9/022 381/86 |
| 2015/0036860 A1 * | 2/2015 | Malcolm | C02F 1/005 381/345 |

FOREIGN PATENT DOCUMENTS

| | | |
|---|---|---|
| DE | 197 17 278 C1 | 11/1998 |
| DE | 101 06 355 C1 | 10/2002 |
| DE | 10 2008 017 084 A1 | 11/2009 |
| DE | 10 2012 003 772.4 | 2/2012 |
| JP | 2005-80103 | 3/2005 |
| KR | 100821396 | 4/2008 |
| WO | WO 2008/055253 A1 | 5/2008 |
| WO | WO 2009/058441 A1 | 5/2009 |
| WO | PCT/EP2012/005243 | 12/2012 |

OTHER PUBLICATIONS

WIPO provided English translation of the International Preliminary Report on Patentability uploaded on the WIPO website on Aug. 28, 2014 for corresponding International Patent Application No. PCT/EP2012/005243.

Office Action issued Sep. 5, 2012 for corresponding German Patent Application No. 10 2012 003 772.4.

Office Action issued Jan. 7, 2013 for corresponding German Patent Application No. 10 2012 003 772.4.

Decision to Grant issued Sep. 26, 2013 for corresponding German Patent Application No. 10 2012 003 772.4.

International Search Report mailed Feb. 28, 2013 for corresponding International Patent Application No. PCT/EP2012/005243.

* cited by examiner

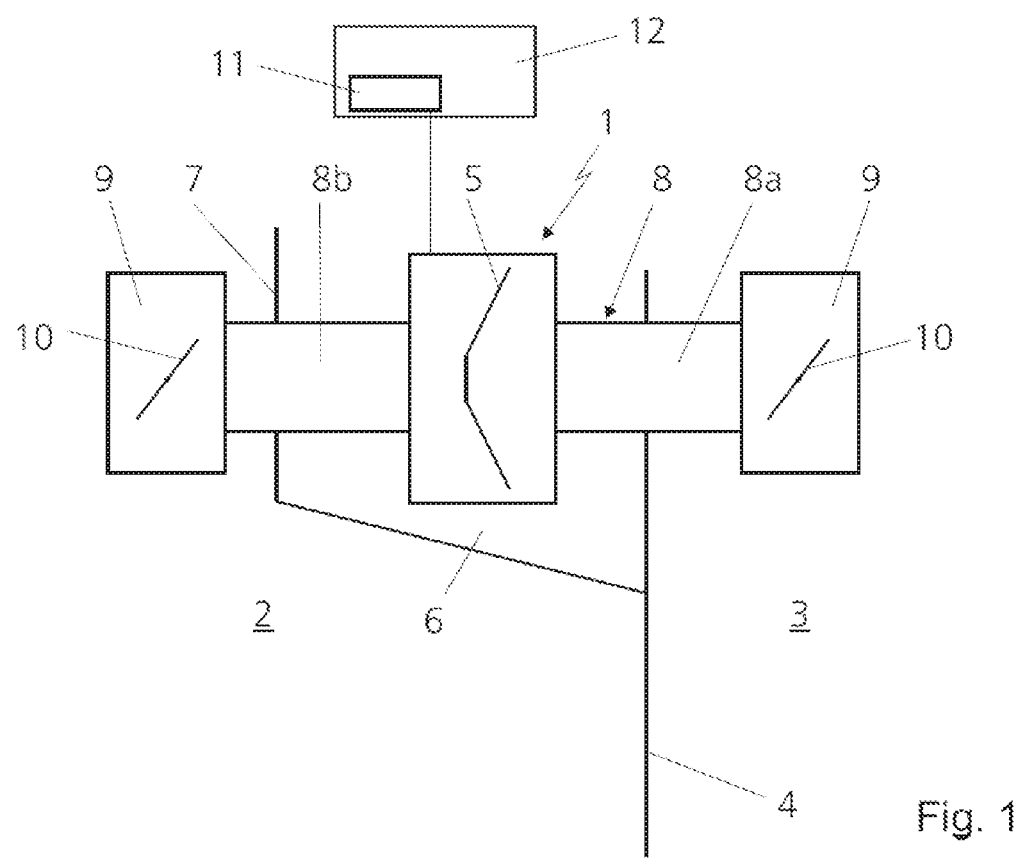
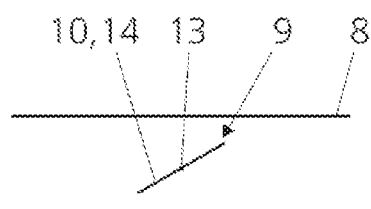
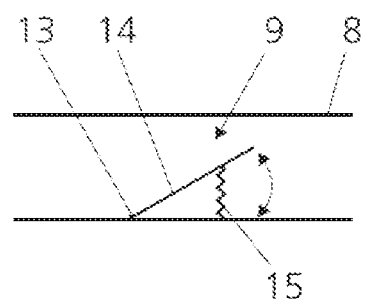

LOUDSPEAKER SYSTEM FOR A MOTOR VEHICLE

CROSS REFERENCE TO RELATED APPLICATIONS

This application is based on and hereby claims priority to International Application No. PCT/EP2012/005243 filed on Dec. 19, 2012 and German Application No. 10 2012 003 772.4 filed on Feb. 24, 2012, the contents of which are hereby incorporated by reference.

BACKGROUND

The invention relates to a loudspeaker system for a motor vehicle, having at least one loudspeaker.

Loudspeaker systems of this type are known from the general related art. On account of the limited installation conditions, the loudspeaker is placed outside the interior or passenger compartment of the motor vehicle, and the sound waves generated are introduced into the passenger compartment via a pipeline. However, the problem here is that, in the states in which the loudspeaker system is not being operated, undesired noises, for example from the engine compartment, can penetrate into the passenger compartment of the motor vehicle, since the loudspeaker diaphragm is not capable of ensuring adequate sound damping.

WO 2009/058441 A1 discloses a door-mounted loudspeaker. The loudspeaker thus directly adjoins the passenger compartment.

SUMMARY

One possible object is to devise a loudspeaker system for a motor vehicle which permits better utilization of the existing installation space and at the same time avoids acoustic problems.

The inventors propose a loudspeaker system for a motor vehicle, having at least one loudspeaker, which is arranged adjacent to at least one wall of the motor vehicle, at least one pipeline originating from the loudspeaker and running through a wall bounding an engine compartment of the motor vehicle. A shut-off device for the at least approximately sound-tight closure of the pipeline is arranged in the at least one pipeline.

The inventor proposes a loudspeaker system for a motor vehicle, having at least one loudspeaker, which is arranged adjacent to at least one wall of the motor vehicle, at least one pipeline originating from the loudspeaker and running through a wall bounding an engine compartment of the motor vehicle. A shut-off device for the at least approximately sound-tight closure of the pipeline is arranged in the at least one pipeline. With the proposed shut-off device arranged in the pipeline, rapid and simple sound-tight closure of the pipeline is possible, so that it is possible to prevent undesired interfering noises from being able to get into the passenger compartment through the pipeline. The loudspeaker system therefore constitutes a solution which is very simple to implement for preventing noise problems for cases in which it is necessary, for example for installation space reasons, to arrange a loudspeaker outside the passenger compartment of the motor vehicle and to connect the same to the passenger compartment by a pipeline.

If, in an advantageous development, provision is made for the at least one pipeline to run through a wall bounding a passenger compartment of the motor vehicle, then the result is a very simple connection of the loudspeaker to the passenger compartment of the motor vehicle, so that the sound generated by the loudspeaker can be transported into the passenger compartment.

Furthermore, provision can be made for the at least one pipeline to run through a wall bounding an engine compartment of the motor vehicle. Such a connection of the loudspeaker to the engine compartment permits enlargement of the volume available to the loudspeaker, which means that the latter can achieve a higher acoustic pressure.

A particularly advantageous refinement relates to the loudspeaker being arranged in a water box, which is bounded by the wall belonging to the passenger compartment and the wall belonging to the engine compartment, wherein in each case a part of the pipeline runs through both walls, and wherein the shut-off device is arranged in at least one of the parts of the pipeline. Arranging the loudspeaker in the water compartment constitutes a particularly good utilization of the installation space and, in addition, permits a simple connection of the same to the passenger compartment, on the one hand, and to the engine compartment, on the other hand.

A simple refinement of the shut-off device is using a shut-off element that can be adjusted between an open and a closed position.

In order to achieve simple actuation of the shut-off element, provision can further be made for the shut-off element to be adjustable between the open and the closed position by a control device.

A further advantageous refinement relates to the shut-off element being adjustable as a function of the operation of an amplifier supplying the loudspeaker. In this way, in operating states in which the loudspeaker is being operated, the pipeline can be opened and, in operating states in which the loudspeaker is not being operated, can be closed in a sound-tight manner by the shut-off element.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows a very schematic side view of an embodiment of the proposed loudspeaker system;

FIG. 2 shows a first embodiment of the shut-off element of the loudspeaker system;

FIG. 3 shows a second embodiment of the shut-off element of the loudspeaker system;

DETAILED DESCRIPTION OF THE PREFERRED EMBODIMENT

Figure 4:
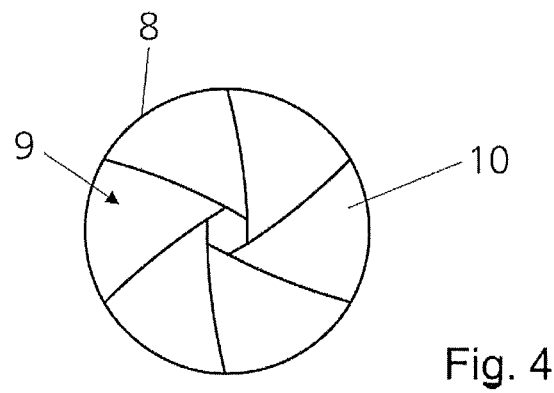
FIG. 4 shows a third embodiment of the shut-off element of the loudspeaker system.

Reference will now be made in detail to the preferred embodiments of the present invention, examples of which are illustrated in the accompanying drawings, wherein like reference numerals refer to like elements throughout.

FIG. 1 shows a loudspeaker system 1 for a motor vehicle, not illustrated in its entirety. From the motor vehicle, an engine compartment 2, that is to say the compartment in which the internal combustion engine (not illustrated) of the motor vehicle is arranged, a passenger compartment 3 and a wall separating the passenger compartment 3 from the engine compartment 2 and formed as a front wall 4 are illustrated. From the loudspeaker system 1, in the present case a loudspeaker 5 is illustrated, being arranged outside the passenger compartment 3 in what is known as a water box 6 of the motor vehicle, which is separated from the engine compartment 2 by a wall 7. The loudspeaker 5 is connected to the passenger compartment 3 by a pipeline 8, of which a part 8*a* runs through the front wall 4. In this way, the sound generated by the loudspeaker 5 is introduced into the passenger compartment 3, so that the sound can reach the passengers in the passenger compartment 3. A part 8*b* of the pipeline 8, starting from the loudspeaker 5, additionally runs in the opposite direction and extends through the wall 7 into the engine compartment 2, by which the volume available to the loudspeaker 5 is increased, since the volume of the engine compartment 2 is also available to the loudspeaker 5 via this part 8*b* of the pipeline 8. This is therefore an open loudspeaker system 1.

In particular, it is recommended to arrange a loudspeaker 5 formed as a subwoofer outside the passenger compartment 3 and to connect the same to the passenger compartment 3 and the engine compartment 2 via the pipeline 8. The designation "pipeline" in this case stands for all the structures which are capable of connecting the loudspeaker 5 acoustically to a chamber in which the loudspeaker 5 itself is not arranged. Of course, the loudspeaker system 1 can have more than the one loudspeaker 5, which can be arranged at any desired locations, not illustrated, in the motor vehicle. These further loudspeakers must not necessarily have an open design. In addition, the loudspeaker 5 can be arranged at a completely different point of the motor vehicle, for example in the area of a luggage compartment. In principle, for the loudspeaker system 1 described herein with its components, as an alternative or in addition to the arrangement illustrated, arrangements in the wheel box, in the fender, in the luggage compartment or at other suitable locations are suitable.

In order to prevent noises from the engine compartment 2, or in the case in which the pipeline 8 does not run as far as the engine compartment 2 from the water box 6, from getting into the passenger compartment 3 through the pipeline 8, a shut-off device 9 for the at least approximately sound-tight closure of the pipeline 8 is arranged in the pipeline 8. In the exemplary embodiment illustrated in FIG. 1, shut-off devices 9 are respectively arranged both in the part 8*a* of the pipeline 8 leading from the loudspeaker 5 to the passenger compartment 3 and also in the part 8*b* of the pipeline 8 leading to the engine compartment 2, so that, optionally or simultaneously, both the part 8*a* and also the part 8*b* of the pipeline 8 can be shut off by the respective shut-off device 9. In principle, however, it would also be possible to dispense with one of the two shut-off devices 9.

As illustrated very schematically in FIG. 1, the two shut-off devices 9*a* and 9*b* or, generally, the at least one shut-off device 9 has a shut-off element 10, which can be adjusted between an open and a closed position. While the shut-off element 10 closes the pipeline 8 in an at least approximately sound-tight manner when in its closed position, in its open position it opens the pipeline 8 at least approximately completely. The shut-off element 10 should be matched to the cross section of the pipeline 8, which in turn can in principle have any desired cross section. Furthermore, FIG. 1 shows, very schematically, a control device 11, which is used to activate the shut-off element 10, in order to adjust the latter between the open and the closed position.

The logic or software required to activate the shut-off element 10 by the control device 11 can be known per se and will therefore not be described in detail.

The control device 11 can be part of an amplifier 12, likewise illustrated schematically, supplying the loudspeaker 5. This makes it possible to adjust the shut-off element 10 as a function of the operation of the amplifier 12, which makes it possible, for example, to close the shut-off element 10 when the amplifier 12 and thus the loudspeaker 5 is not being operated, and to open the shut-off element 10 when the amplifier 12 and the loudspeaker 5 are being operated. Provision can be made here for the shut-off element 10 to be closed automatically when the loudspeaker 5 is not being operated, i.e. for the closed position to represent the basic position of the shut-off element 10.

Provision can be made for the control device 11 to be formed such that it is able to detect automatically whether a signal is present on the loudspeaker 5. In this case, for example by integral calculation, it can be determined whether opening or closing the shut-off element 10 is practical. In this way, it would be possible to avoid the shut-off element 10 opening or closing too frequently. For example, provision could also be made that opening or closing the shut-off element 10 can be carried out only a specific time after a preceding switching operation, in order to avoid excessively frequent switching of the shut-off element 10.

In principle, it would also be possible to operate the control device 11 such that the shut-off element 10 remains open or closed as a function of specific sound effects. For example, in the event of a choice of "speech", the shut-off element 10 could always remain closed, since a subwoofer is possibly not necessary for the transmission of speech.

Furthermore, it would be possible to leave to the driver of the motor vehicle the choice as to whether he would like to operate the shut-off device 9 at all, i.e. the driver could switch off the shut-off device 9 by a switch, not illustrated, or via an appropriate sub-item in an operating menu, so the pipeline 8 would always be open.

Various embodiments of the shut-off element 10 are illustrated schematically in FIGS. 2 to 6. Here, FIGS. 2 and 3 show an embodiment of the shut-off element 10 in which the latter is formed as a flap 14 that can be rotated about an axis of rotation 13. While in FIG. 2 the flap 14 can be rotated about an axis of rotation 13 located substantially in a central area of the same, in the embodiment of FIG. 3 the axis of rotation 13 is provided in an edge area of the flap 14. As a result, when in its open state, the flap 14 is located on the edge of the pipeline 8, while in the embodiment of FIG. 2 the flap 14 is located in the center of the pipeline 8 when in its opened state. Furthermore, in the embodiment of FIG. 3, the flap 14 is loaded in the direction of its closed position by a spring element 15. This means that the flap 14 is forced into its closed position by the spring element 15, while, in order to open the flap 14, a force which is directed counter to the action of the spring element 15 must be applied. An electric motor, for example, can be used for the drive of the flap 14.

In the embodiment of the shut-off element 10 according to FIG. 4, the same is formed as a central closure, in which a plurality of lamellae move in the manner of a diaphragm concentrically inward into the pipeline 8 from the circumference and, respectively, out from the center in the direction of the circumference, in order respectively to open and close the pipeline 8. Such a central closure has the advantage that, in the opened state of the same, no section of the same is located in the cross section of the pipeline 8.

Figure 5:
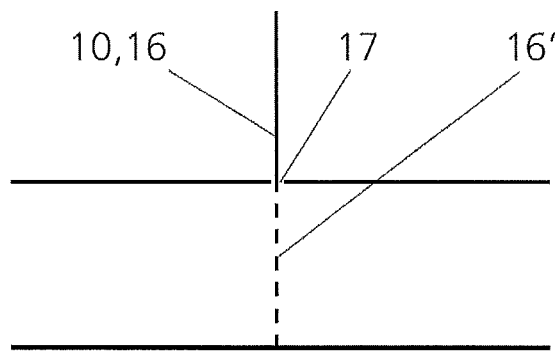
FIG. 5 shows a fourth embodiment of the shut-off element of the loudspeaker system.

The embodiment according to FIG. 5 shows the shut-off element 10 as a disk 16 that can be moved into the cross section of the pipeline 8. Here, the open position of the disk 16 is illustrated by the continuous line, and the closed position of the disk 16 is illustrated by the dashed line designated by 16'. The disk 16 is moved into the pipeline 8 through a slot 17 in the latter. The slot 17 can be provided with brushes or another suitable seal, in order to prevent emergence of the sound through the slot 17. In addition, in the case of the disk 16, in the opened state of the same no section of the same is located in the cross section of the pipeline 8.

Figure 6:
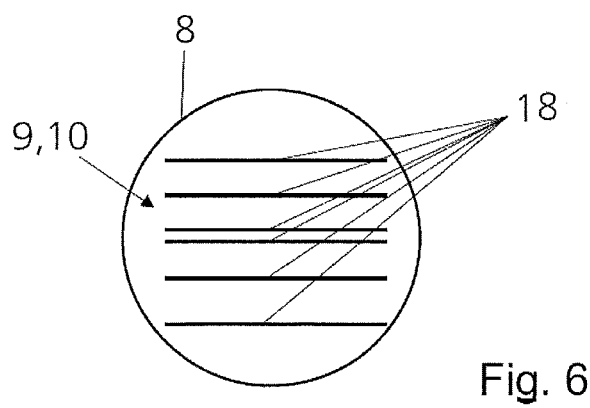
FIG. 6 shows a fifth embodiment of the shut-off element of the loudspeaker system.

The embodiment of the shut-off element 10 according to FIG. 6 has a plurality of lamellae 18 which can be rotated about respective axes of rotation, not specifically designated, in order either to close or to open the cross section of the pipeline 8, depending on the position of the lamellae 18.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A loudspeaker system for a motor vehicle having an engine compartment and a wall bounding the engine compartment, comprising:
   a loudspeaker, which is arranged adjacent to the wall bounding the engine compartment;
   a pipeline originating from the loudspeaker and running through the wall bounding the engine compartment; and
   a shut-off device in the pipeline, to selectively provide an at least approximate sound-tight closure of the pipeline when activated, wherein
   the shut-off device has a shut-off element movable between an open position and a closed position,
   the loudspeaker is powered by an amplifier, and
   the shut-off element is moved between the open and closed positions as a function of operation of the amplifier.

2. The loudspeaker system as claimed in claim 1, wherein
   the motor vehicle has a wall bounding a passenger compartment of the motor vehicle, and
   the pipeline runs through the wall bounding a passenger compartment.

3. The loudspeaker system as claimed in claim 2, wherein
   the wall bounding the engine compartment is separate from the wall bounding the passenger compartment, and
   the pipeline runs through both the wall bounding the engine compartment and the wall bounding the passenger compartment.

4. The loudspeaker system as claimed in claim 2, wherein
   a water box is provided between the wall bounding the passenger compartment and the wall bounding the engine compartment, and
   the loudspeaker is provided in the water box.

5. The loudspeaker system as claimed in claim 4, wherein
   the pipeline has first and second parts,
   the first part of the pipeline runs through the wall bounding the engine compartment,
   the second part of the pipeline runs through the wall bounding the passenger compartment, and
   the shut-off device is arranged in at least one of the first and second parts of the pipeline.

6. The loudspeaker system as claimed in claim 5, wherein
   the shut-off device comprises first and second shut-off elements to provide an approximate sound-tight closure of the first and second parts of the pipeline, respectively.

7. The loudspeaker system as claimed in claim 5, wherein
   the loudspeaker is provided between the first and second parts of the pipeline.

8. The loudspeaker system as claimed in claim 1, wherein
   a control element controls movement of the shut-off element between the open and closed positions.

9. The loudspeaker system as claimed in claim 1, wherein
   the shut-off element is in the open position when the amplifier is operating, and
   the shut-off element is in the closed position when the amplifier is not operating.

10. The loudspeaker system as claimed in claim 1, wherein
    a control element controls movement of the shut-off element, and
    when the amplifier changes states, the control element requires the amplifier to operating or not operating for a predetermined period of time before the shut-off element is opened or closed, respectively.

11. The loudspeaker system as claimed in claim 1, wherein
    the shut-off element is moved between the open and closed positions as a function of specific sound effects.

12. The loudspeaker system as claimed in claim 1, wherein the shut-off element is biased toward the closed position.

13. The loudspeaker system as claimed in claim 1, wherein
    the shut-off element is formed as a flap that can be rotated about an axis of rotation.

14. The loudspeaker system as claimed in claim 13, wherein
    the shut-off element is in the open position when the flap is parallel to walls of the pipeline and the shut-off element is in the closed position when the flap is rotated to be perpendicular to walls of the pipeline.

15. The loudspeaker system as claimed in claim 1, wherein the shut-off element is formed as a central closure.

16. The loudspeaker system as claimed in claim 1, wherein
    the shut-off element is formed as a central closure,
    the shut off element comprises a plurality of lamellae that are moved concentrically inward or outward as a diaphragm.

17. The loudspeaker system as claimed in claim 1, wherein
    the shut-off element is formed as a disk that can be moved into and out of a cross section of the pipeline.

18. The loudspeaker system as claimed in claim 1, wherein
    the loudspeaker is a subwoofer, and
    both the engine compartment and a passenger compartment are open to the subwoofer when the shut-off device is not activated.

* * * * *